Sept. 16, 1958     N. HUDSON     2,852,273
COUPLING MECHANISM WITH SERVICE CONNECTIONS
FOR AUTOMOTIVE VEHICLES
Filed Oct. 10, 1957     4 Sheets-Sheet 1
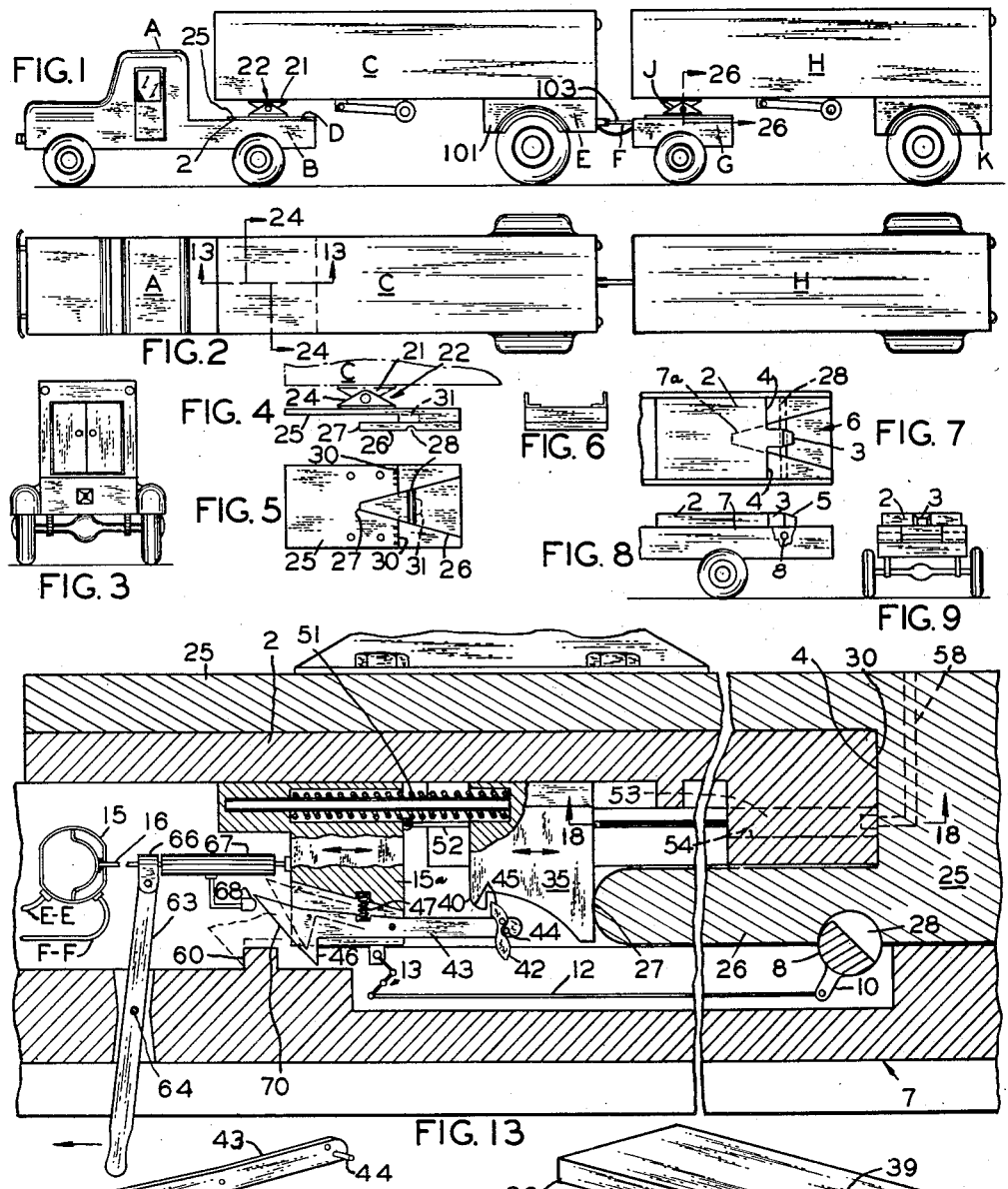
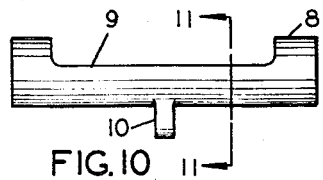
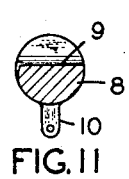
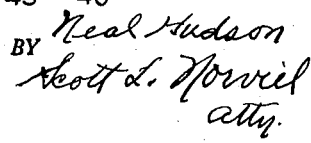
INVENTOR.
Neal Hudson
BY Scott L. Norvill
atty.

Sept. 16, 1958  N. HUDSON  2,852,273
COUPLING MECHANISM WITH SERVICE CONNECTIONS
FOR AUTOMOTIVE VEHICLES
Filed Oct. 10, 1957  4 Sheets-Sheet 2
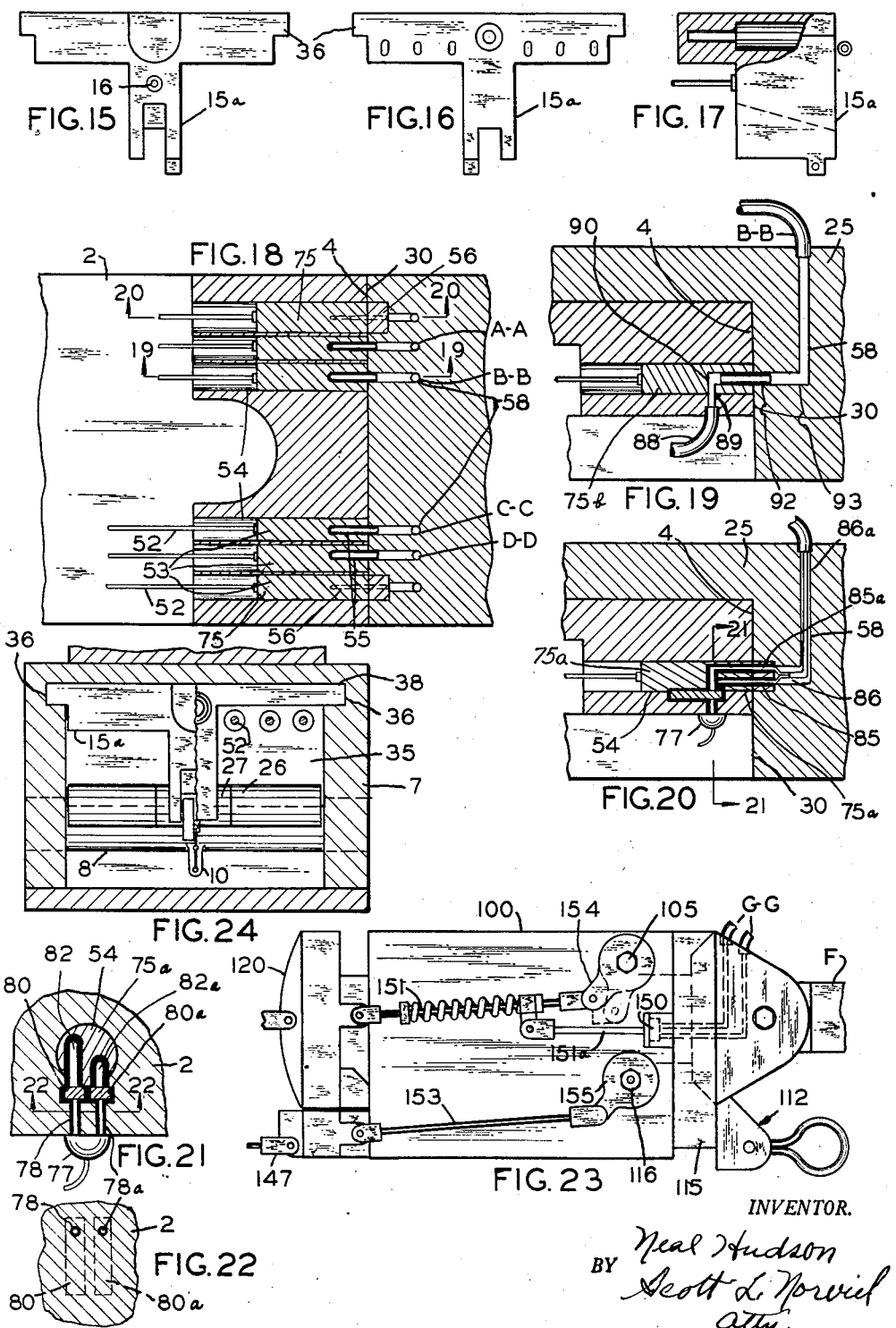
INVENTOR.
Neal Hudson
BY Scott L. Norvell
atty.

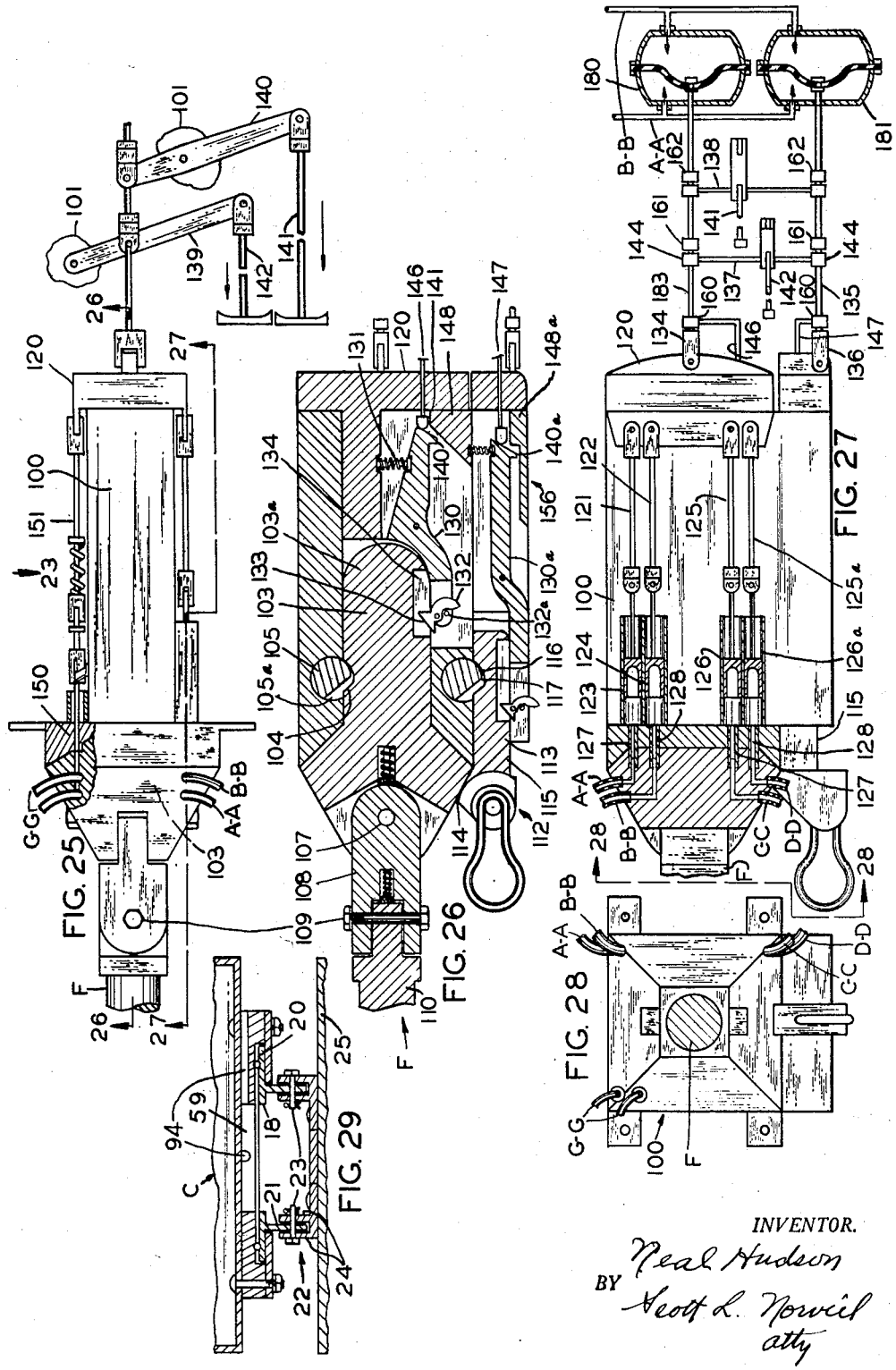

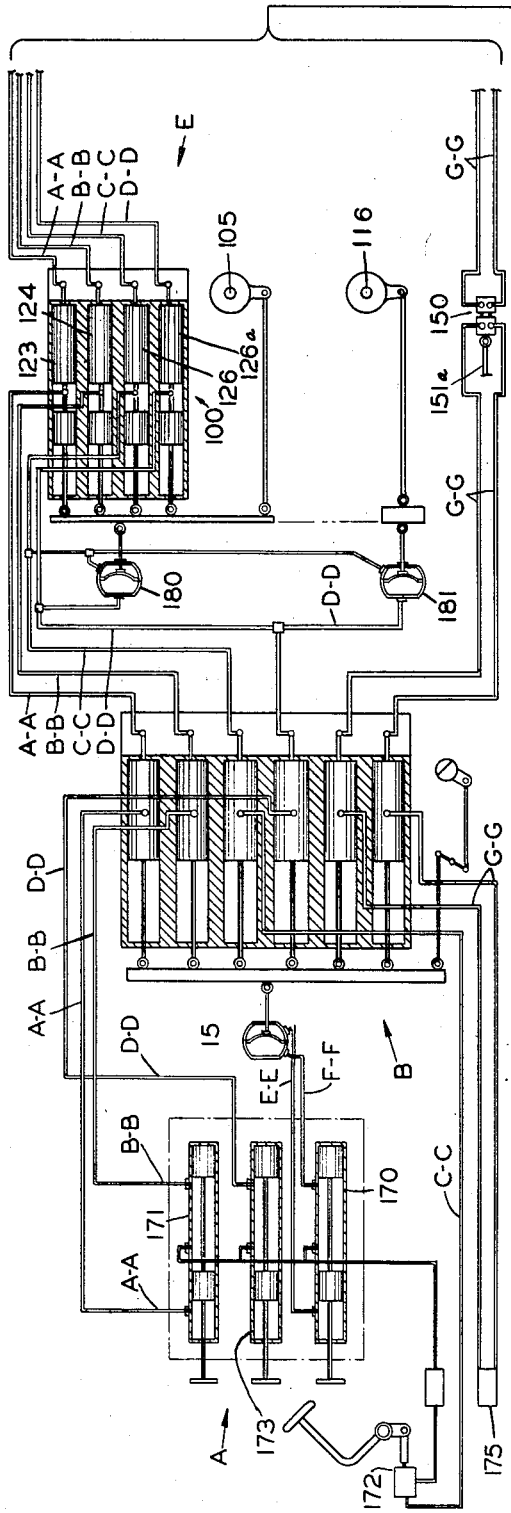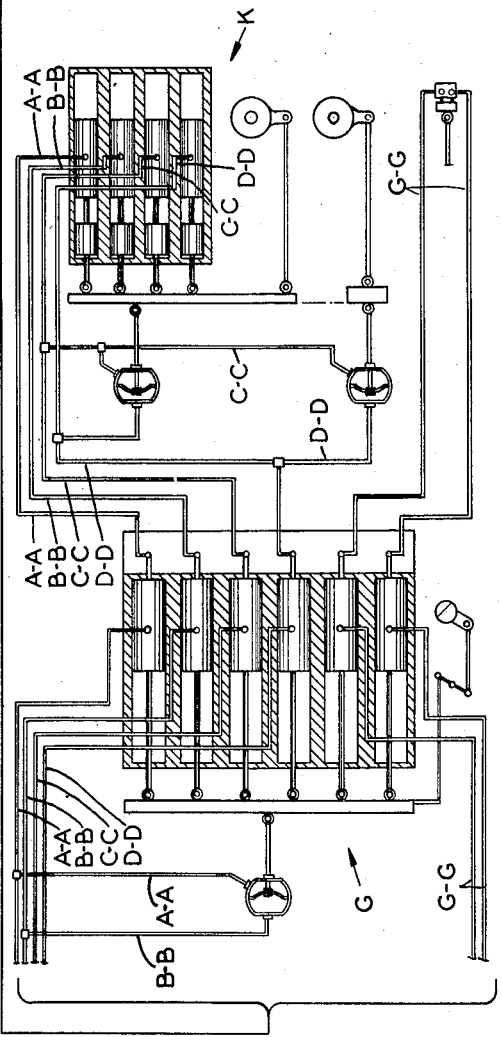
FIG. 30
INVENTOR.
Neal Hudson
BY Scott L. Norwiel
atty

United States Patent Office 2,852,273
Patented Sept. 16, 1958

2,852,273

COUPLING MECHANISM WITH SERVICE CONNECTIONS FOR AUTOMOTIVE VEHICLES

Neal Hudson, Phoenix, Ariz.

Application October 10, 1957, Serial No. 689,313

6 Claims. (Cl. 280—420)

This invention concerns a hitch for automatically coupling semi trailers to cab over trucks or for coupling trailers to vehicles.

One of the objects of the coupler is to provide means whereby coupling may be had with the minimum of effort and labor on the part of the operator, and with a maximum of safety and holding power.

Another object of the device is to provide a coupler which is automatic in its operation and may be controlled entirely from the cab of the tractive vehicle.

Still another object of the invention is to provide a coupler which may be operated by pneumatic means controlled from the cab of the tractive vehicle and may also be operated by mechanical means in case of the failure of the pneumatic means.

Still another object of the coupler is to provide a coupling device for the tongue of the trailer vehicle and an independently operated hitch for holding and latching a safety chain.

Still another object is to provide means for joining compressed air lines, pipes or tubes between the tractive and the trailer vehicle when the tongue is latched and likewise to provide the joining of electrical connections between the tractive and the trailer vehicle when the tongue is latched and coupled by this device.

The coupler is provided with two openings, one of which receives the tongue and the other a joining device for the safety chain.

On the flanges of the opening that receives the tongue there are extending tubes which form a means of connecting compressed air from the tractive vehicle to the trailer vehicle. Likewise there are prongs which provide means for electrical connections.

The tongue which fits into the said opening has mating recesses to receive both the compressed air tubes and the electrical connections. The tongue also has a notch to receive the latching mechanism. Likewise the device for latching the safety chain has a notch for the latching device.

The coupler body, aside from having openings to receive the tongue and chain coupler, has a sliding means, operated either by air or manually, for pushing the air connecting prongs in and out of the coupler body and into proper recesses in the tongue.

Valves are provided which will control compressed air to operate these air and electrical connections in plunger fashion.

During and after the operation of the plunger there is a connection which will rotate a semi round latch which fits into the notches in both the tongue and the safety chain connecting device. A partial rotation of these latches affects the completion of latching.

I attain the foregoing objects by means of the devices, parts and combinations of parts shown in the accompanying drawings in which:

Figure 1 is a side elevational view of a semi truck and trailer together with a follower trailer;

Figure 2 is a plan view thereof;

Figure 3 is a rear end view of the semi-trailer;

Figure 4 is a side view of the coupling plate and locking tongue;

Figure 5 is an under side view thereof;

Figure 6 is a rear end view thereof;

Figure 7 is a plan view of the top face of the coupling plate of the semi truck;

Figure 8 is a side view thereof;

Figure 9 is an end view of said coupling plate;

Figure 10 is a front elevational view of the locking shaft, drawn on an enlarged scale;

Figure 11 is a cross sectional view of the tongue locking shaft taken on line 11—11 of Figure 10 and drawn on an enlarged scale;

Figure 12 is a perspective view of the tongue locking latch;

Figure 13 is a mid-sectional view of the tongue locking mechanism operating in said truck, drawn on a greatly enlarged scale and taken substantially on line 13—13 of Figure 2;

Figure 14 is a perspective view of the sliding block operating between the tongue and the latch block cross head dog hook;

Figure 15 is an end elevational view of the front end of a slide block cross head which operates within the coupling housing;

Figure 16 is a rear end view of the said cross head slide block;

Figure 17 is a side elevational view of said cross head slide block;

Figure 18 is a sectional view of a fragment of the latching mechanism showing connections for the compressed air and electric lines between the tractor vehicle and the trailer vehicle, taken on lines 18—18 of Figure 13 and drawn on an enlarged scale;

Figure 19 is a longitudinal sectional view of a portion of a coupling block showing the connecting mechanism for an air line between the vehicles;

Figure 20 is a sectional view of a fragment of the connecting parts showing details of an electrical line coupling means;

Figure 21 is a vertical section thereof taken substantially on line 21—21 of Figure 20;

Figure 22 is a bottom view of said electrical line coupling means;

Figure 23 is a side elevational view of the coupling mechanism between the trailers showing the side opposite to that shown in Figure 27;

Figure 24 is a sectional end view, taken on line 24—24 of Figure 2, of the coupling mechanism within the case as shown in Figure 13;

Figure 25 is a plan view of the coupler between the trailer units showing the modification for the use of a tongue;

Figure 26 is a mid-sectional view thereof;

Figure 27 is a side elevational view thereof with parts sectioned off to show the interior and with a diagrammatic representation of the operating valve system;

Figure 28 is an end view thereof with the tongue sectioned off on line 28—28 of Figure 27;

Figure 29 is a mid-sectional view of the fifth wheel swivel mechanism, drawn on an enlarged scale; and Figure 30 is a diagrammatic view of the several valve control mechanisms and hook means as used in the operation of the tractor and two trailers shown in Figure 1.

Similar numerals refer to similar parts in the several views.

Since the objects, as above stated, include the provision of an automatic coupling means between a tractor vehicle and a drawn or trailer vehicle, the illustrations herewith show two examples; the first is a coupling between the rear supporting platform of a semi-truck and a semi-trailer which is drawn by this truck. The second is a coupling between the rear end of the semi-trailer and a rear trailer which has a tongue at its forward end. Both couplings include provisions for coupling a plurality of compressed air lines from the truck to the drawn or trailed vehicle, also provisions for coupling electric lines between the truck and the trailed vehicle. In each instance the coupling means is made automatic so that the forward vehicle may be backed onto the coupling means of the following vehicle while the coupling means aligns itself and automatically locks the coupling parts as the vehicles are moved toward each other, and several air line pipes are coupled and the electrical connections coupled, at the same time.

The rear end portion of the truck or tractive vehicle A is provided with a receiving coupling mechanism incorporated in a rectangular casing to form a coupling unit and indicated by the letter B. The front end of the semi-trailer C has a complementary coupling mechanism D which fits into and cooperates with the mechanism in unit B. In the rear end portion of the semi-trailer C there is a unit E which contains coupling mechanism similar in principle to that in unit B but is modified to receive the tongue F which extends forwardly from the unit G on the front end of the rear trailer H.

On the rear end of the tractor and as a part of unit B there is a plate 2 which forms the top of this unit and has a rearwardly projecting coupling guide 3 which is slightly tapered toward the rear and has a bevel 5 along its top rear edge. Shoulders 4 extend outward on each side of this guide. This plate forms the top of unit B and its rear end projects partially over a V-shaped rearwardly directed coupling notch 6. Within the opening of notch 6 and below the rearwardly extending portion of plate 2 and guide 3, there is a locking shaft 8 which extends transversely of the unit B with its ends bearing in holes in the side portions of the body 7 of the unit. The central portion 9 of shaft 8 has a semi-circular section. At the center of this shaft there is a crank 10 which is operated by a rod 12 which extends forward through intermediate levers 13 to an air operated cross head slide block 15a operated by diaphragm unit 15 through rod 16. Air to this unit (sometimes called a booster unit) is controlled by a valve 170 in the cab of the truck A.

Beneath the front end of the semi-trailer there is a large circular ring 18 (Figure 29) in an annular race 20 in the bottom of the forward end of the semi-trailer body C. Ring 18, rotating in race 20, performs the function of a fifth wheel. On the bottom of ring 18 there are transverse pivotal bearing lugs 21 which form the upper part of a hinged joint 22, between the trailer bed and the forward coupling tongue unit body 7. The lower part of this joint 22, including lugs 24, is attached to the top face of coupling plate 25. Pins 23 extend through both lug parts of the hinge joint. On the bottom of plate 25 and spaced from the plate 25 there is a triangular shaped tongue 26 which has front end 27 directed forwardly and is adapted to fit into the space below plate 7, and into notch 7a. The tongue has a transverse semi-round groove 28 on its bottom face. On each side of this tongue there are shoulders or butt plates 30 separated by a notch 31 which is adapted to receive the rearwardly extending coupling guide 3 of the top plate 7 on unit B. The tongue 26 is positioned to enter the V notch 6 in unit B below said rearwardly extending coupling guide 3 and above the locking shaft 8.

In order to push the tongue into position in the V notch the locking shaft 8 must be in a position so that the flat surface 9 of its central portion is facing upward. After the tongue has entered the V notch and is below guide 3, rotation of the locking shaft 90 degrees will cause it to move into locking relation in groove 28 on the bottom face of tongue 26, as shown in Figure 13. When the tongue 26 is locked in notch 6 the shoulders 4 on plate 2 abut the shoulders 30 on plate 25.

In coupling the tractor A to the semi-trailer C, the front end of the semi-trailer is temporary supported on a jack or its equivalent, and the truck is backed toward the front end of the semi-trailer C. The top face of the unit B is maneuvered under the face of coupling plate 25 on the semi. The truck is then backed so that the V notch moves onto the tongue 26. The sides of the V notch line up the angular side edges of the tongue 26. The plate 25 pivots on the ring 20 to accommodate lining up of these parts and plate 25 also tilts on hinge joint 22 as the plates 25 and 2 are brought together. When plate 25 rests on plate 2 and the tongue 26 enters the V notch 6 and the space below the coupling guide 3, the tongue may be pushed to the "lockup" position, as shown in Figure 13. In this position the guide 3 enters the notch 31 just over the central part of the tongue.

As the end 27 of the tongue enters the space beneath plate 2 it encounters slide block 35 which slides fore and aft in grooves 36 within the body 7 of unit B which engage the lateral portions 38 of the top 39 of the slide.

The hook 40 on the inner end of slide block 35 engages pivoted dog 42 on pivoted hook 43 and since counter-clockwise motion of dog 42 is prevented by stop pin 44, the dog 42 and the end of hook 43 which carries the dog is forced down by the contact of their slanting faces 45. Tension of open spring 47 is overcome and the hook 46 at the opposite end of the pivoted hook body 43 raises and clears stop lug 60. Meanwhile air pressure in booster 15 forces rod 16 rearward sliding crosshead block 15a rearward, compressing spring 51 which operates between blocks 15a and 35, and pushes coupling operating rods 52 and their piston guides 53, which work in holes 54 in shoulders 4, toward air coupling horns 55, and electric coupling prongs 56. The piston guides 53 carry two air line coupling horns 55 on each of the two shoulders 4, and also one bayonet electric line coupler prong 56 on each shoulder.

The result of coupling is that after the tongue is pushed in place and latched, and the shoulders 4 and 30 abutted, the crosshead slide 15a operated by booster 15 pushes all four air line horns and the two electrical bayonet prong connectors into respective sockets in the shoulder 30 on the under face of plate 25. Air hoses and electrical conduits lead from the several vertical holes 58 in shoulders 30 up through a radial opening 59 in the fifth wheel and thence rearwardly through the body of the semi-trailer C where the several conduits and conductors go through latching and connecting mechanism in unit E to unit G in rear trailer C.

It is to be understood that in the form of latch above described, as well as the latch between the trailers hereinafter described, the latch body has mechanism for making connections between the air lines and an electric line in the forward vehicle to similar lines in the trailed vehicle.

A crosshead operating in the body forces horns or plungers and bayonet fittings through suitable guides and into receptacles in the tongue structure. Latches are provided in the body to prevent the operation of this crosshead until the tongue has been inserted in the opening provided for it and has tripped the latches and the latch dog on the latches. When these parts are tripped then the air mechanism or hand mechanism can force the various prongs and bayonets into position. Otherwise these parts are locked so as to be immobile until the tongue is in position to receive them. Figures 18 through 22 show the details of the working parts of the coupling mechanism and air and electric connecting mechanism within the body 7 of the tractor A.

As shown in Figure 13, the tongue, after contacting the slide block 35, is locked by the rotation of the bar 8 and a tension is placed on spring 51.

In uncoupling, the normal method is to provide air pressure on the back side of booster 15 through the line F—F. This pulls rod 16 which, in turn, pulls cross head sliding block 15a and this, in turn, pulls all of the rods 52 from their connections with the various air lines and electrical connections in the block 25. At the same time the shaft 8 is rotated through the mechanism 13, rod 12 and coupling rod lever 10.

In an unusual case where the air line is not used or is ineffective, I provide a manual operation for this cycle consisting of a lever 63 which is pivoted at 64 in the body 7 and extends out below it. This lever operates a slide 66 on rod 16, and this, in turn, operates a release slide 67 which has a contact point 68, adapted to engage the angular face 70 at the front end of the latch dog 43. Motion of this bar in the direction of the arrow, at the outer end, forces the cylinder 67 and the point 68 against the surface 70 and raises the catch portion 46 of dog 43 so that it releases from the raised lug 60. Further motion of the lever 63 forces the cross head 15a rearwardly and hence forces the rods 52 to engage the several prongs and fittings for the air and electrical lines. A reverse motion of this lever would disengage these several fittings.

In Figure 18 it is to be noticed that there are three rods 52 shown at the lower side of the figure. These rods are connected to piston-like guides 75 which operate in the guide holes 54 in block 2. There are electrical fittings 56 at each edge portion of the blocks in the figure.

Details of the electrical fitting are shown in Figures 20, 21, and 22. The electrical connection starts with a two wire plug 77, which connects to two insulated conductors 78 and 78a in the forward portion of the block 2. These vertical connectors terminate with two slide contact bars 80 and 80a (see Figure 21). The piston guide 75a operating in guide hole 54 moves over the connecting plates 80 and 80a so that contact is made with metal conduits 82 and 82a which are within the piston guide 75a. These conduits are bent so that they are directed toward the end of the piston 75a and are made hollow so that they will receive the prongs 85 and 85a of bayonet fitting 86 in that portion of body 25 which is termed the shoulder 30.

The air lines represented by tube 88 Figure 19, are connected through a hole 89 in guide piston, such as 75b so that when the piston is pushed to the limit of its travel the opening 90 in the piston will connect with the hole 89 and deliver air to the air prong or horn 92. This horn fits into a receiving hole 93 in the shoulder 30 of the plate portion 25.

It is to be understood that the sectional view shown in Figure 19 is typical of all air lines that are connected by this mechanism. Further, the connecting mechanism shown in Figures 20, 21 and 22 is typical of both electrical connections.

The operation of these parts is such that after shoulder 4 abuts shoulder 30 the several air lines and electrical fittings are pushed into operating contact by the sliding cross head 15a.

From the vertical hole 58 (Figure 19) the air is led, in this instance, to the air line B—B. The double conductor 86a is led up through hole 58, in block 25, as shown in Figure 20, to an electric line. After leaving holes 58 in the block body 25, all air lines and electrical lines are led upward to the fifth wheel mechanism and led out through notches 94 in the upper part of the fifth wheel mechanism. These lines continue through the body of forward trailer C and are led down into the unit E. This coupling unit will be described in detail later. From the coupling unit E a tongue F extends forward from the dolly coupling unit G of the second trailer H. The dolly coupling unit G contains coupling mechanism the same as that above described and contained in the unit B on tractor A. This enables the forward end of the rear trailer H to be mounted on a fifth wheel J which is the same as that at D at the front end of the semi trailer C. From the unit G lines are led to the rear of the trailer H and connected to a unit K which is the same as unit E on trailer C. Therefore, if the dolly unit G is removed from the second trailer H it may be attached to the rear of the tractor A in the manner previously described and concerning the units D and B. As shown in the figures, the dolly unit G is provided with the tongue F which is substantially its only difference relative to the units D and B at the back of the tractor. The unit K, as shown, is inoperative.

With reference to the coupling mechanism in unit E attention is called to Figures 25, 26, 27, 28 and 23.

This coupling unit consists of a body 100 which is attached to the casing 101 of unit E in any suitable solid manner. Within this body there is space to receive the front end 103 of the tongue F. The upper face of this tongue has a transverse notch 104 which is locked by the action of the semi round portion 105a of locking shaft 105 which operates similar to shaft 8 in connection with the coupling unit in body 7 of unit B. Tongue end 103 is pivoted on a transverse shaft 107 in intermediate tongue block 108. At the rear portion of this block there is a vertical bolt pin 109 which pivots it to the front end 110 of tongue F. This gives the front end 103 a universal adjusting movement.

Below the tongue F there is a safety chain latch 112 which slides into the body of this coupling element as indicated at 113. This safety chain latch is lightly attached to the lower part of tongue head 103 as indicated by numeral 114 by tack welding or the equivalent. In case of the failure of the tongue by its breakage, or otherwise, the safety chain locking body 115 will be held by the rotary locking shaft 116 which operates in a transverse groove 117 in the chain latch bar 115.

The latching mechanism of the tongue and the safety chain bar is shown in the other figures of this group. Thus, in Figure 27, it is noted that the crosshead 120 operates coupling mechanism including the rods 121 and 122 which control the piston guides 123 and 124. Also below these there are the coupling rods 125 and 125a which operate similarly on the cylindrical guides 126 and 126a. All these piston guides operate air coupling horns or prongs such as 127 and 128, on lines A—A and B—B, as well as on lines C—C and D—D and are of the same general construction as the line couplers shown in Figures 18 through 22.

Within the body of this coupler there is a centrally pivoted latch bar 130. This is kept in a position with its forward end down by a spring 131. At its rear end there is a pivoted latch dog 132 which has a slanting forward face 133 that operates in a notch 134 on the lower face of the tongue end 103.

Normally when the tongue end 103 is inserted within the latch body the latch dog 133 is pushed down by the lower portion of the front end of tongue part 103 to let the tongue pass over it and permit the slanting face 133 to enter the notch 134. Pivot motion counter clockwise is stopped by pin 132a. The forward end of pivoted latch bar 130 is raised during this motion to permit the hook 140 at its forward end to pass over the stop block portion 141 at the rear portion of the coupling body 100 so that crosshead 120 can be moved rearward in body 100. This rearward motion of crosshead 120 connects the air line horns 127 and 128 and the electrical prong connection 150. This fitting is operated by rod 151 and 151a on the side of latch body 100, shown in Figure 23. It is to be noted that rod 151 also operates crank 154 on locking shaft 105, and that rod 153 operates crank 155 on locking shaft 116.

A similar mechanism 156 operates the latching and unlatching of the slide 115 of the safety chain latch 112.

In Figure 26 this intermediate latch is shown in locked up or latched position. The crosshead 120 has been pushed toward and into the body 100 to the limit of its travel, and the air line prongs have been forced into place as well as the electrical connection 150 on the opposite side of the body, as shown in Figure 23.

This latching motion has been accomplished by the use of the two boosters 180 and 181 connected to air lines A—A and B—B in parallel. These boosters are positioned within the case 101 and attached to suitable points on the inner faces of the walls of this body. The crosshead 120 is operated by push rod 183 which is connected to the cross head by clevis 134. Similarly, the diaphragm of booster 181 is connected by a push rod 135 which is attached to the lower chain latching slide 115 by clevis 136.

To latch and unlatch this unit manually I provide manual controls which consist of lost motion slides 137 and 138. These are operated by levers 139 and 140 which, in turn, are operated by manual pull rods 141 and 142. These rods are affixed at any convenient place on the outside of the unit E. It will be noticed that when the push rods 183 and 135 are operated by the boosters, these rods merely slip through the slides 144 on the respective rods 183 and 135. Pull rod 141 may be used to unlatch the tongue from its position shown in Figure 26, by a motion rearward which pulls crosshead forward. Likewise, pull rod 142 may be used to latch the tongue when the air is not present to operate the boosters by a motion rearward which pushes the crosshead 120 into the body 100. In this motion the slides 144 contact unlocking sliding fingers 146 and 147 which unlatch hooks 140 and 140a from engagement with stops 148 and 148a on body 100.

Manual operation entails engagement of slides 144 with slide collars 160 of the fingers 146 and 147 to release the latches 130 and 130a. Also with collars 161 and 162 on rods 183 and 135, respectively.

It will be noted that when the tongue enters the recess 103a, in the body 100, the nose of the tongue 103 contacts the angular face 133 of the latch dog 132. This depresses the front end of the latch bar 130 and raises the hook 140 so that the crosshead will slide over the lug stop 148. Similarly chain latch bar 130a raises hook 140a. This permits the inward motion of the crosshead 120 which, in turn, moves the four prongs of the air lines and the two prongs 150 of the electric lines into connected position.

Unlocking of the tongue first requires that the crosshead move to the rear in order to rotate the locking shafts 105 and 116 to unlocked position. In doing this the slanting face at the fore end of latch bar 130 slides over the lug 148. The same takes place at the fore end of the chain latch bar 130a. When this outward motion of the crosshead takes place the latching shafts 105 and 116 are rotated to open position and the tongue is easily moved outward from the latch block 100.

From the foregoing it will be understood that I have provided a means whereby a semi-trailer may be easily and efficiently coupled to a truck or trailer. It is to be understood, according to the objects of this invention, that the coupling can be controlled by mechanism in the cab of the tractor A and that the coupling also includes the coupling of a plurality of air lines and electric lines which are extended back from the coupling between the tractor and the first semi-trailer to and through a coupling between the first trailer into the second trailer. Broadly, it is intended that the dolly G shall include mechanism sufficient to hook onto and couple with the front end of any semi-trailer that has the mechanism herein disclosed. The provision of the mechanism in the case 101 at the rear end of each trailer, and indicated broadly by the letters E and K, makes the coupling system possible.

The coupling between the truck A and the trailer C has been described in detail and broadly it is to be understood that this includes a platform and an opening to receive a tongue pivotally mounted by a type of fifth wheel on the forward end of the trailer C. The fifth wheel mechanism includes a V-shaped tongue having forwardly converging sides which fit into the opening provided in the mechanism B. When the tongue is pushed into the opening provided for it in B, the operator in the cab of the truck may provide air pressure for the mechanism by opening piston valve E—E which controls the booster 15. This latches the mechanism between B and D. The valve is indicated by numeral 170. Latching of the mechanism in B connects the air lines A—A, B—B and B—D to air lines which extend to the unit E. Coupling in this unit is controlled by boosters 180 and 181 in the housing 101. Air lines operating this connecting means are shown at A—A and B—B operated by the valve 171. A foot operated valve 172 is connected to line C—C and is intended to extend to unit 100 in E. This controls unlatching of the coupler 100. The coupler being locked by manipulation of valve 173 through line D—D. In this case the valve 173 is operated by hand and the unlatching operation is taken care of by the foot valve 172. A battery 175 is located in the cab and supplies current through the electric lines G—G. These lines are connected in the coupling unit B and carried rearward through the coupling unit in E where they are joined by the prong switches 150. The electric lines then continue to the coupling unit in the dolly unit G and continue on to the final coupling unit in K. These electric lines are used to supply various lights or other electrical appliances in the trailers. Since this invention is concerned only with the coupling units and not with the braking system, whether it be by air brakes or electrically operated brakes, no details of these auxiliaries and/or braking systems are shown. However, it is to be understood that the air lines may be tapped at any convenient position along their length where the application of air is needed. The system as a whole, which makes use of the various coupling devices shown, is illustrated diagrammatically in Figure 30.

I claim:

1. Coupling mechanism for automotive vehicles consisting of a latch mechanism having a plate, on the rear end of a tractive vehicle, a centrally disposed latch guide at the rear end of this plate, shoulders on each side of said guide, a rearwardly opening tongue receiving cavity below said plate having forwardly converging sides, a rotative latching shaft extending transversely of said sides having a centrally disposed semi-round portion having a flat face to pass the under face of a tongue, a V-shaped tongue having forwardly converging sides conforming to the sides of said cavity, and a semi-round transverse notch to receive the semi-round portion of said latching shaft, an upwardly extending spacer on the rear end portion of said tongue having a central notch on its forward edge to receive said latch guide and shoulders on each side of said guide adapted to abut the shoulders on said plate on each side of said guide, a tongue support plate attached to said spacer and extending forward over said plate on said vehicle and bearing on the upper face of said plate, a fifth wheel mechanism under the fore end of a semi-trailer transversely hinged to the upper face of said tongue plate, a plurality of air line and electric line connecting prongs slidably operating in the shoulders of the plate on said tractor, a plurality of air line and electric line receptacles in the abutting shoulders on said spacer disposed to receive said respective prongs, and pneumatic mechanism on said vehicle to slidably operate said prongs into and out of said receptacles and rotate said latching shaft from latched to unlatched position when said tongue is inserted into said opening in latching position.

2. A coupling mechanism for installation in the rear end of a tractive vehicle and adapted to receive and latch a tongue on the fore end of a following vehicle, composed of a case on the rear end of said tractive vehicle, a body attached within said case having a rearwardly facing tongue receiving opening, said opening having forwardly converging sides and top and bottom and a rectangular opening to receive the fore end of a tongue, a rotary type locking shaft having a semi-round central portion with a flat face to permit entrance of the tongue end portion, a plurality of slidable air line connecting prongs and a pair of slidable electric bayonet type connectors extending rearward from the sides of said opening, mechanism for locking said tongue in said opening and sliding said prongs and connectors to and from said tongue, consisting of a slidable crosshead operated by a pneumatic diaphragm type booster, push rods connecting said crosshead with said slidable prongs and bayonet fittings, and a rod connected to said locking shaft adapted to rotate it from an open position with the flat face adjacent said tongue to a locked position with the semi-round portion extending between said coupler body and said tongue, in combination with a tongue having a rectangular body with forwardly converging side faces, and a rectangular forwardly extending portion having a transverse notch on its under face to receive the semi-round portion of said locking shaft when it is in locking position and air and electric receptacles on the faces of said tongue body adapted to receive said air connecting prongs and electric bayonet connectors, and mechanism to control latching of said shaft after said tongue is inserted in the openings in said latch body and then force said slidable prongs and bayonet connectors into the receptacles in said tongue body.

3. The mechanism described in claim 2 in combination with a chain latching slide operating in said latch body, having a safety chain ring at its outer end and rotary latch means including a rotary latch shaft within said latch body, lightly attached to and moving with said tongue.

4. The mechanism described in claim 1 in combination with a manually operated lever and connecting parts for manually operating said latching mechanism when said pneumatic mechanism is inoperative.

5. The mechanism described in claim 2 in combination with a manually operated lever and connecting parts for manually operating said latching mechanism when said pneumatic mechanism is inoperative.

6. In a tongue latching mechanism for automotive vehicles, having a latch body with an opening to receive a tongue, a crosshead slidably operating relative to said body, air lines and electric lines extending from the cab of the vehicle to said latch body, latching mechanism for said air and electric lines including slidable air line prongs and electric bayonet connectors in the latch body operated by said crosshead and adapted to be forced into receptacles in said tongue by movement of said crosshead, and connected to the said air and electric lines from said cab, mechanism including a latch lever and a dog on said lever to retain said crosshead and prongs and bayonet connectors in retracted unlatched position until released by the insertion of said tongue into the opening in said latch body said tongue having means to trip said latch and dog.

References Cited in the file of this patent

UNITED STATES PATENTS

| | | |
|---|---|---|
| 1,805,642 | Strachan | May 19, 1931 |
| 1,880,123 | Davis et al. | Sept. 27, 1932 |
| 1,973,610 | Connors | Sept. 11, 1934 |
| 2,062,806 | Casler | Dec. 1, 1936 |
| 2,070,832 | Johnson | Feb. 16, 1937 |
| 2,092,115 | Gurton et al. | Sept. 7, 1937 |
| 2,094,399 | Fuchs | Sept. 28, 1937 |
| 2,119,460 | Gurton et al. | May 31, 1938 |
| 2,480,483 | Kirksey | Aug. 30, 1949 |
| 2,667,365 | Hollifield | Jan. 26, 1954 |